United States Patent
Ikeda et al.

(10) Patent No.: US 7,455,477 B2
(45) Date of Patent: Nov. 25, 2008

(54) COMPOUND, METHOD FOR STABILIZING SHWERTMANNITE, METHOD FOR CLARIFYING POLLUTED WATER OR POLLUTED SOIL, AND METHOD FOR ADSORBING PHOSPHORIC ACID

(75) Inventors: Hodaka Ikeda, Toshima-ku (JP); Kenichi Ito, Kanazawa (JP); Naoko Akita, Kita-ku (JP); Tsutomu Sato, Kanazawa (JP); Keisuke Fukushi, Hakodate (JP)

(73) Assignee: Sophia Co., Ltd., Tokyo (JP)

( * ) Notice: Subject to any disclaimer, the term of this patent is extended or adjusted under 35 U.S.C. 154(b) by 357 days.

(21) Appl. No.: 10/544,488

(22) PCT Filed: Feb. 3, 2004

(86) PCT No.: PCT/JP2004/001078

§ 371 (c)(1),
(2), (4) Date: Aug. 4, 2005

(87) PCT Pub. No.: WO2004/069741

PCT Pub. Date: Aug. 19, 2004

(65) Prior Publication Data

US 2006/0088464 A1    Apr. 27, 2006

(30) Foreign Application Priority Data

Feb. 5, 2003    (JP)    ............................. 2003-027876
Nov. 26, 2003   (JP)    ............................. 2003-395635

(51) Int. Cl.
C01B 25/37    (2006.01)
C02F 1/28     (2006.01)
B09C 1/08     (2006.01)

(52) U.S. Cl. .................. 405/128.5; 210/683; 423/306

(58) Field of Classification Search ................. 423/306; 405/128.5; 210/683
See application file for complete search history.

(56) References Cited

FOREIGN PATENT DOCUMENTS

JP    2004-358396    * 12/2004

OTHER PUBLICATIONS

K. Fukushi, et al."Adsorption or arsenic (V) by shwertmannite;" *Preprint of 2001 Meeting of The Mineralogical Society of Japan*; p. 71 and translation, no month.

K. Fukushi, et al.; "The behavior of As.in low crystalline iron mineral during its alteration process;" *Preprint of 2001 Meeting of Mineralogical Society of Japan/Symposium of The Japanese Association of Mineralogists, Petrologists & Economic Geologists*; 2001; p. 106 and translation, no month.

(Continued)

*Primary Examiner*—Wayne Langel
(74) *Attorney, Agent, or Firm*—Kratz, Quintos & Hanson, LLP

(57) ABSTRACT

A new compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$) formed by adding a shwertmannite of a composition formula $Fe_8O_8(OH)_{8-2x}(SO_4)_x$ ($1 \leq x \leq 1.75$) to a phosphoric acid solution of a pH value of 2-9 thereby achieving a stabilization by an adsorption of phosphoric acid, shows a very firm stabilization under conditions of $0 < a \leq 1.253$ and $0.497 \leq b \leq x$. The new compound has a high stability, can maintain a high adsorbing ability for arsenic and the like and a cleaning level for a necessary period or semi-permanently, and can adsorb arsenic and the like in polluted water or polluted soil.

5 Claims, 1 Drawing Sheet

OTHER PUBLICATIONS

K. Fukushi, et al.; "Natural attenuation of arsenic at the Nishinomaki abandoned mine district in Gunma prefecture;" *Preprint of 2001 Meeting of Atomic Energy Society of Japan*; 2001; and translation, no month.

K. Fukushi, et al.; "Natural arsenic cleaning in Higashi-Daira prior mining area in Gunma prefecture;" *Preprint of 2000 Meeting of The Clay Science Society of Japan*; vol. 44; 2000; pp. 52-53 and translation, no month.

K. Fukushi, et al.; "Stability of schwertmannite adsorbing As(V);" *The Japanese Association of Mineralogists, Petrologists and Economic Geologists, 2002 Nendo Gakujutsu Koen Kai Koen Yoshishu*; vol. 2002; 2002; p. 48 (1 Sheet.), no month.

T. Sato, et al.; "Attenuation of arsenic contaminated water from tube wells in Bangladesh by schwertmannite;" *The Japanese Association of Mineralogists, Petrologists and Economic Geologists, 2002 Nendo Gakujutsu Koen Kai Koen Yoshishu*; vol. 2002; 2002; p. 47 (1 Sheet.), no month.

K. Fukushi, et al.; "Anion adsorbing mechanism of shwertmannite;" *Preprint of 2001 Meeting of the Clay Science Society of Japan*; vol. 45; 2001; pp. 82-83 and information sheet (3 Sheets.), no month.

K. Fukushi, et al."Adsorption of arsenic (V) by shwertmannite;" *Preprint of 2001 Meeting of The Mineralogical Society of Japan*; 2001; p. 71 (1 Sheet.), no month.

K. Fukushi, et al.; "The behavior of As in low crystalline iron mineral during its alteration process;" *Preprint of 2001 Meeting of Mineralogical Society of Japan/ Symposium of The Japanese Association of Mineralogists, Petrologists & Economic Geologists*; 2001; p. 106 (1 Sheet.), no month.

K. Fukushi, et al.; "Natural attenuation of arsenic at the Nishinomaki abandoned mine district in Gunma prefecture;" *Preprint of 2001 Meeting of Atomic Energy Society of Japan*; 2001; (1 Sheet.), no month.

K. Fukushi, et al.; "Natural arsenic cleaning in Higashi-Daira prior mining area in Gunma prefecture;" *Preprint of 2000 Meeting of The Clay Science Society of Japan*; vol. 44; 2000; pp. 52-53 (2 Sheets.), no month.

\* cited by examiner

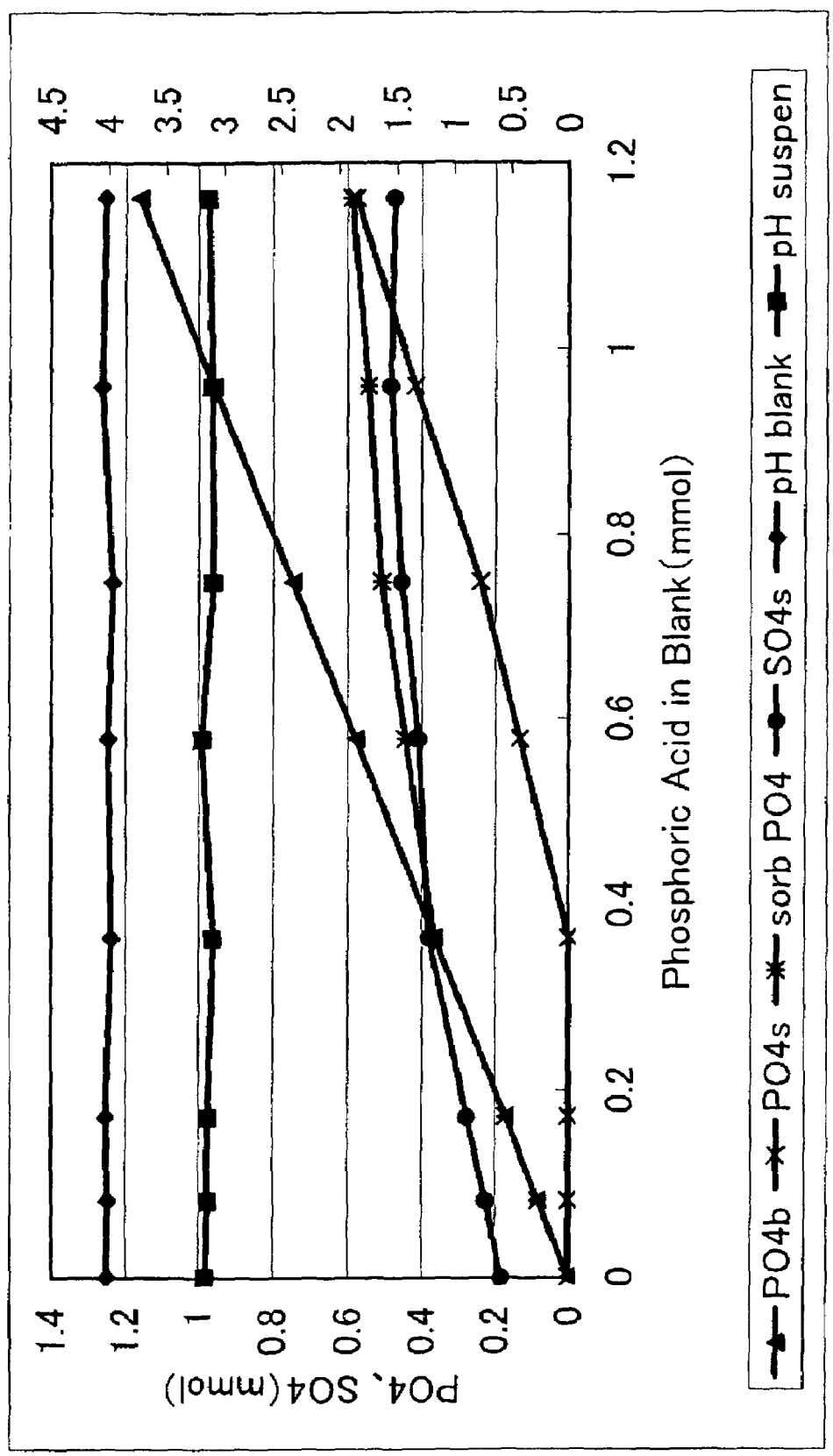
FIGURE

COMPOUND, METHOD FOR STABILIZING SHWERTMANNITE, METHOD FOR CLARIFYING POLLUTED WATER OR POLLUTED SOIL, AND METHOD FOR ADSORBING PHOSPHORIC ACID

TECHNICAL FIELD

The present invention relates to a new compound obtained by stabilizing a shwertmannite having a function of principally adsorbing arsenic, a stabilizing method for shwertmannite and a method for cleaning polluted water or polluted soil.

BACKGROUND ART

Shwertmannite has been known to have a high arsenic adsorbing property. Shwertmannite is an iron oxide hydroxide sulfate salt having a composition of $Fe_8O_8(OH)_{8-2x}(SO_4)_x$ ($1 \leq x \leq 1.75$), and the shwertmannite that has adsorbed arsenic is stabilized in structure and continues to retain arsenic. Known literatures referring to the arsenic adsorption of shwertmannite include non-patent literatures 1-5, and those referring to the cleaning of water polluted with arsenic by shwertmannite include a non-patent literature 6.

Non-patent literature 1: Anion adsorbing mechanism of shwertmannite (Keisuke Fukushi, Tsutomu Sato and Nobuyuki Yanagise, Preprint of 2001 Meeting of the Clay Science Society of Japan, 45, p. 78-79);

Non-patent literature 2: Adsorption of arsenic (IV) by shwertmannite (Keisuke Fukushi, Yoshikazu Sakaki and Tsutomu Sato, Preprint of 2001 Meeting of The Mineralogical Society of Japan, 2000, p. 71);

Non-patent literature 3: Process of modification of low crystalline iron mineral and behavior of arsenic (Keisuke Fukushi, Yuki Kotake, Tsutomu Sato and Nobuyuki Yanagise, Preprint of 2001 Meeting of Mineralogical Society of Japan/Symposium of The Japanese Association of Mineralogists, Petrologists & Economic Geologists, 2001, p. 106);

Non-patent literature 4: Natural arsenic cleaning in Nishinomaki discontinued mining area in Gunma prefecture (Keisuke Fukushi, Yoshikazu Sasaki, Tsutomu Sato, Nobuyuki Yangihara and Hikaru Amano, Preprint of 2001 Meeting of Atomic Energy Society of Japan);

Non-patent literature 5: Natural arsenic cleaning in Higashi-Daira prior mining area in Gunma prefecture (Keisuke Fukushi, Yoshikazu Sasaki and Tsutomu Sato, Preprint of 2000 Meeting of The Clay Science Society of Japan, 44, p. 52-53);

Non-patent literature 6: Cleaning of arsenic-polluted well water with shwertmannite in Bangladesh (Tsutomu Sato, Keisuke Fukushi, Ken-ichi Ito, Hotaka Ikeda, Kazuhiro Hamabe and Baku Yokota, Preprint of 2002 Meeting of The Mineralogical Society of Japan, 2002, p. 47).

DISCLOSURE OF THE INVENTION

As shwertmannite has a high arsenic adsorbing ability as described above, there is recently investigated to clean a polluted soil or polluted water with shwertmannite, but the shwertmannite, being a semi-stable phase of goethite, tends to be oxidized thereby showing a phase change to goethite. It is therefore oxidized in contact with air or water in a prolonged storage or in a transportation, thereby resulting in drawbacks of showing a loss in the adsorbing ability or in the cleaning level, and, in case of a high-level cleaning by mixing in polluted water or a polluted soil of a low arsenic concentration, of being incapable of exhibiting an adsorbing ability of a desired level by a phase change to goethite. Therefore, a compound excellent in stability and capable of withstanding a storage of a necessary period or a transportation and exhibiting a high arsenic adsorbing ability and a high cleaning level has been desired.

The present invention is made in consideration of the aforementioned drawbacks, and an object of the invention is to provide a new compound excellent in stability and capable of withstanding a storage of a necessary period or a transportation and exhibiting a high arsenic adsorbing ability and a high cleaning level, and another object is to provide a method of stabilizing shwertmannite and a method of cleaning polluted water or polluted soil by the new compound.

A new compound of the present invention is a new compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$), or a new compound represented by a composition formula $Fe_8O_8(OH)_{8-2x}((SO_4)_a, ((HPO_4)_b)_x \cdot nH_2O$ (a+b=x, $1 \leq x \leq 1.75$, $0 < a \leq 1.658$, $0.092 \leq b \leq x$).

Further, the new compound of the present invention is a new compound represented by a composition formula $Fe_8O_8(OH)_{8-2x}((SO_4)_a, (HPO_4)_b)_x$ (a+b=x, $1 \leq x \leq 1.75$, $0 < a \leq 1.253$, $0.497 \leq b \leq x$), or a new compound represented by a composition formula $Fe_8O_8(OH)_{8-2x}((SO_4)_a, (HPO_4)_b)_x \cdot nH_2O$ (a+b=x, $1 \leq x \leq 1.75$, $0 < a \leq 1.253$, $0.497 \leq b \leq x$).

Also a method for stabilizing shwertmannite is characterized in adding a shwertmannite of a composition formula of $Fe_8O_8(OH)_{8-2x}(SO_4)_x$ ($1 \leq x \leq 1.75$) to a phosphoric acid solution of a pH value of 2-9 thereby achieving a stabilization by an adsorption of phosphoric acid as a new compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$). In the aforementioned stabilizing method, the stabilization may be executed as a new compound represented by a composition formula $Fe_8O_8(OH)_{8-2x}((SO_4)_a, (HPO_4)_b)_x$ (a+b=x, $1 \leq x \leq 1.75$, $0 < a \leq 1.253$, $0.497 \leq b \leq x$), and the phosphoric acid solution at the addition of shwertmannite preferably has a pH value of 3-7.

Also a cleaning method of the present invention for polluted water or polluted soil is characterized in adding a new compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$) to polluted water or polluted soil and causing an adsorbable substance such as arsenic, phosphoric acid, selenium or chromium contained in the polluted water or polluted soil to be adsorbed by the new compound. The aforementioned cleaning method may also employ a new compound represented by a composition formula $Fe_8O_8(OH)_{8-2x}((SO_4)_a, (HPO_4)_b)_x$ (a+b=x, $1 \leq x \leq 1.75$, $0 < a \leq 1.253$, $0.497 \leq b \leq x$).

A pH value of the polluted water or the polluted soil at the addition of the new compound is maintained at about 2-9 in case of adsorbing arsenic as the adsorbable substance, also at about 2-9, preferably 3-7 in case of adsorbing phosphoric acid, also at about 1.8-10.9 in case adsorbing selenium, and at about 3.5-10.5 in case of adsorbing chromium. Also the polluted water and the polluted soil include suitable liquid and soil, containing arsenic, phosphoric acid, selenium, chromium or a combination thereof. Also the new compound to be added to the polluted water or the polluted soil may be added as powder, solid or solution in water according to the necessity.

Also a method for adsorbing phosphoric acid of the present invention is characterized in adding shwertmannite of a composition formula $Fe_8O_8(OH)_{8-2x}(SO_4)_x$ ($1 \leq x \leq 1.75$) to a phosphoric acid solution of a pH value of 2-9, or to polluted water or polluted soil containing phosphoric acid, thereby adsorbing phosphoric acid. In the adsorption method for phosphoric acid, there can be adopted a suitable configuration in case of stabilizing shwertmannite according to the present invention.

Thus, the new compound of the present invention, being prevented from a change to goethite or an oxidation by air or water by the adsorption of phosphoric acid, has a stability capable of withstanding a storage of a required period or a transportation in the use as an actual product, and can maintain, for a required period, and exhibit a high adsorbing ability or a high cleaning level to the adsorbable substance such as arsenic or phosphoric acid. Also a new compound which has adsorbed a small amount of phosphoric acid, is suppressed from an oxidation by a contact with air or water and, maintaining a stability capable of withstanding a storage of a required period or a transportation, can exhibit a very high adsorbing ability or a very high cleaning level to arsenic and the like. Also a new compound which has adsorbed a large amount of phosphoric acid is prevented from an oxidation by a contact with air or water, thus no longer changing to goethite, showing an extremely satisfactory stability and capable of semi-permanently exhibiting a high adsorbing ability and a high cleaning level.

Particularly in case of adsorbing pentavalent arsenic, arsenic is more easily adsorbed by shwertmannite in a comparison of phosphoric acid and arsenic in equal amounts, and the arsenic contained in the polluted water or the polluted soil substitutes not only a sulfuric acid group but also a phosphoric acid group present in the new compound, whereby a arsenic adsorbing ability and a cleaning level of an extremely high degree can be exhibited. It is therefore also possible to mix the new compound in polluted water or polluted soil of a low arsenic concentration, thereby achieving a cleaning of a very high level.

Also the new compound of the present invention or the stabilized shwertmannite can be obtained by an adsorption of phosphoric acid by shwertmannite, and, since phosphoric acid has a high safety, can be dissolved in a solution in an acidic to neutral pH range in which shwertmannite executes adsorption, and is inexpensive, it is possible to produce the new compound or to stabilize shwertmannite safely, by an easy and efficient work and also with a low cost.

Also the adsorbing method for phosphoric acid of the present invention can exhibit a very high adsorbing ability for phosphoric acid, thereby capable of eliminating phosphoric acid contained in water or in soil. Therefore, it can be used against an evil influence by phosphoric acid such as euteriphication.

BRIEF DESCRIPTION OF THE DRAWING

The FIGURE is a graph showing a relationship between a concentration and pH of phosphoric acid in each test section, and an absorption amount of phosphoric acid and a release amount of sulfuric acid.

BEST MODE FOR CARRYING OUT THE INVENTION

At first, on a new compound obtained by stabilizing shwertmannite and a method for stabilizing shwertmannite, there will be explained an example of adding a hydrate crystal of shwertmannite: $Fe_8O_8(OH)_{8-2x}(SO_4)_x \cdot nH_2O$ ($1 \leq x \leq 1.75$) in a phosphoric acid solution to execute a stabilization by adsorption of phosphoric acid, thereby obtaining a new compound.

EXAMPLE

Assuming a shwertmannite of a composition formula: $Fe_8O_8(OH)_{4.5}(SO_4)_{1.75}$ (molecular weight: 819.441) containing sulfuric acid group at maximum, an artificially synthesized hydrate crystal of shwertmannite: $Fe_8O_8(OH)_{4.5}(SO_4)_{1.75} \cdot 16.5H_2O$ (molecular weight: 1116.705) was utilized as a test sample. 1.0 g of the test sample contained shwertmannite by 733.40 mg (0.895 mmol), Fe of shwertmannite by 400 mg (7.162 mmol), water by 266.6 mg (14.798 mmol), and $SO_4$ by 150.34 mg (1.566 mmol).

Also a solution of disodium hydrogenphosphate dodecahydrate ($Na_2HPO_4 \cdot 12H_2O$) was used as a phosphoric acid solution, and the concentration of the solution disodium hydrogenphosphate was regulated, assuming that a maximum adsorption amount of phosphoric acid by shwertmannite was 1 mol of phosphoric acid to 1 mol of shwertmannite or 8 mol of iron. The aforementioned assumption was based on a result of another experiment that a maximum adsorption amount of arsenic was about 1 mol per 1 mol of shwertmannite.

In the solution of disodium hydrogenphosphate, trace amounts of a sodium hydroxide (NaOH) solution and a nitric acid ($HNO_3$) solution (or $HNO_3$ solution only) were added to adjust the pH value at 4.0, and a 1.0 mol/l solution of sodiumnitrate ($NaNO_3$) was added as a supporting electrolyte into the solution of disodium hydrogenphosphate, so as to obtain a cocentration of 0.01 mol/l in the solution of disodium hydrogenphosphate.

It is also possible to employ another phosphoric acid solution instead of the solution of disodium hydrogenphosphate. Also the shwertmannite can satisfactorily adsorb phosphoric acid or phosphoric acid group by maintaining the phosphoric acid solution such as the solution of disodium hydrogenphosphate at a pH range of 2-9, and a pH range of the phosphoric acid solution of 3-7 is preferable for achieving a more satisfactory adsorption. As the phosphoric acid solution at the adsorption of phosphoric acid or phosphoric acid group, there can be employed a phosphoric acid solution regulated at an appropriate pH value within the aforementioned pH range.

A concentration of disodium hydrogenphosphate in the disodium hydrogenphosphate solution, added with disodium hydrogenphosphate dodecahydrate and employed in each test section, is shown in Table 1. The disodium hydrogenphosphate solution in each test section was prepared by 100 ml, by preparing a 0.1 mol/l disodium hydrogenphosphate solution and a 1.0 mol/l sodium nitrate solution and by dilution with deionized water.

TABLE 1

| test section | concentration (mmol/l) | addition amount (ml/100 ml) | content in 40 ml (mmol) |
| --- | --- | --- | --- |
| A | 0 | 0 | 0 |
| B | 0.1 | 0.1 | 0.004 |
| C | 0.2 | 0.2 | 0.008 |
| D | 0.4 | 0.4 | 0.016 |
| E | 0.6 | 0.6 | 0.024 |
| F | 0.8 | 0.8 | 0.032 |
| G | 1.0 | 1.0 | 0.04 |
| H | 1.2 | 1.2 | 0.048 |

In the solution for each test section, the hydrate crystal of shwertmannite was set at a suspension concentration of 1 g in 1 l. of disodium hydrogenphosphate, then 40 mg of each disodium hydrogenphosphate solution were charged in a 50 ml polycarbonate centrifuging tube, then 40 mg of the hydrate crystal of shwertmannite (0.0358 mmol, containing iron by 16 mg=0.286 mmol), were added, the centrifuging tube was shaken for 4 hours at 60 rpm to execute an adsorption of phosphoric acid or phosphoric acid group, and, after the shaking, a solid-liquid separation was conducted with a membrane filter (0.2 μM) to obtain a liquid phase and a solid phase.

The liquid phase after the separation was subjected to measurements of a pH value and concentration of $PO_4$ and $SO_4$ by an ion chromatography. In each test section, a blank disodium hydrogenphosphate solution, not added with shwertmannite, was provided, and the result of the measurement was compared with the blank to investigate an adsorption amount of $PO_4$ and a release amount of $SO_4$ by shwertmannite. For confirming reproducibility, three centrifuging tubes of a same setting were provided in each test section, and a numerical value was obtained by an averaging.

Also the solid phase was subjected to a ripening test. More specifically, 30 mg of each solid phase, containing shwertmannite, recovered from the phosphoric acid adsorption experiment by the disodium hydrogenphosphate solutions A-H shown in Table 1, were added with a small amount of purified water to obtain a suspension, and the suspension was entirely coated and fixed on a slide glass, which was placed in a container, containing water, so as not to be in direct contact with water. Then each container was placed in a thermostat equipment of 50° C. and let to stand under a saturated water vapor pressure of 50° C., and subjected to an XRD measurement before standing, after 2 days, after 10 days, after 1 month, after 2 months and after 4 months. Based on the results of XRD measurement, a qualitative investigation was conducted on an adsorption amount of phosphoric acid group and a stability of shwertmannite.

A result of measurement by the ion chromatography on the liquid phase is shown in FIG. 1. In the FIGURE, an ordinate at the right-hand side indicates pH, pH blank indicates pH of the blank, and pH suspen indicates pH of the separated liquid phase. Also in FIG. 1, an ordinate at the left-hand side indicates a concentration, $PO_4$b indicates a concentration (mmol/l) of the phosphoric acid group in the blank solution, $PO_4$s indicates a concentration (mmol/l) of the phosphoric acid group in the aforementioned liquid phase, and sorb$PO_4$ means (concentration of the phosphoric acid group in the blank —concentration of the phosphoric acid group in the aforementioned liquid phase), indicating a concentration (mmol/l) of the phosphoric acid group adsorbed in 1 l. of solution. As the hydrate crystal of shwertmannite and disodium hydrogenphosphate solution has a solid/liquid ratio of 1.0 g/l, the sorb$PO_4$ is equal to a concentration of phosphoric acid group adsorbed per 1 g of hydrate crystal of shwertmannite. $SO_4$s indicates a concentration (mmol/l) of sulfuric acid in the aforementioned liquid phase.

Based on the concentrations sorb$PO_4$ and $SO_4$s in the FIGURE, it is identified that the phosphoric acid group and the sulfuric acid group execute an exchange in approximately equal molar amounts. Also a maximum adsorption amount of phosphoric acid or phosphoric acid group, in case the disodium hydrogenphosphate solution had a phosphic acid concentration of 1.2 mmol/l, was about 0.6 mmol/l (about 57.6 mg/g per 1 g of the hydrate crystal of shwertmannite), and, when expressed in phosphor P, a maximum adsorption amount of P was about 18.6 mg/g. On the other hand, since 1 g of the hydrate crystal of shwertmannite (0.895 mmol of shwertmannite) contains the sulfuric acid groups $SO_4^{2-}$ of about 1.57 mmol, a theoretical value of the maximum adsorption amount of the phosphoric acid groups $HPO_4^{2-}$, when all the sulfuric acid groups are replaced by phosphoric acid, is similarly about 1.57 mmol (about 150.72 mg/g per 1 g of hydrate crystal of shwertmannite), and, when expressed in phosphor P, a theoretical value of the maximum adsorption amount of P is about 48.6 mg/g. Thus, the experimental result showed a maximum adsorption amount lower than the theoretical value, and the cause for such result may be ascribable to a fact that the reaction time was limited to 4 hours and that phosphoric acid was lower in the affinity than arsenic, adsorbed by 1 mol to 1 mol of shwertmannite.

Also as a result of the XRD measurement on the solid phase, a sign of change to goethite was observed after 2 days in the solution A without the addition of disodium hydrogen phosphate, after 1 week in the solution B, after 1 month in the solution C and after 2 months in the solution D, but the results after 4 months and thereafter did not from the result after 2 months. Also E-H did not show a change to goethite. Therefore, in B-D, namely in case phosphoric acid is adsorbed by 0.082-0.364 mmol per 1.0 g of the hydrate crystal of shwertmannite (0.895 mmol of shwertmannite of $Fe_8O_8(OH)_{4.5}(SO_4)_{1.75}$), the change of shwertmannite into goethite can be effectively delayed, and, the change to goethite can be prevent, for example, for 1 week or more in B with a phosphoric acid adsorption of 0.082 mmol or larger, for 1 month or less in C with a phosphoric acid adsorption of 0.172 mmol or larger, and 2 months or more in D with a phosphoric acid adsorption of 0.364 mmol or larger. Also in E-H, namely in case of a phosphoric acid adsorption of 0.445-0.588 mmol per 1.0 g of the hydrate crystal of shwertmannite, or stated differently in case of a phorphoric acid adsorption of 0.445 mmol or larger per 1.0 g of the hydrate crystal of shwertmannite, it is made possible to completely prevent a change to goethite and to very firmly stabilize the shwertmannite.

As the aforementioned amounts 0.082 mmol and 0.445 mmol of the adsorbed or substituted phosphoric acid corresponds to 1.0 g of hydrate crystal of shwertmannite or 0.895 mmol of shwertmannite, it is possible, by adsorbing or substituting 0.092 mol or larger of phosphoric acid per 1 mol of shwertmannite, to effectively delay the change to goethite, and, by adsorbing or substituting 0.497 mol or larger of phosphoric acid per 1 mol of shwertmannite, to achieve a very firm stabilization. Estimating that the theoretical value at which the sulfuric acid is entirely substituted by phosphoric acid is practically difficult to achieve and assuming that the attainment of the theoretical value is not essential for the stabilization of shwertmannite, the shwertmannite stabilized by adsorbing phosphoric acid or phosphoric acid ion, or the new compound obtained by a phosphoric acid adsorption on shwertmannite can be represented, in case of a phosphoric acid adsorption of 0.092 mol or larger, by a composition formula of $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$), and, in case of a phosphoric acid adsorption of 0.497 mol or larger, represented by $Fe_8O_8(OH)_{8-2x}((SO_4)_a, (HPO_4)_b)_x$ (a+b=x, $1 \leq x \leq 1.75$, $0 < a \leq 1.253$, $0.497 \leq b \leq x$).

In the foregoing, an example of the new compound has been explained, and, the new compound that has adsorbed phosphoric acid or shwertmannite that has adsorbed phosphoric acid, by an addition to polluted water or polluted soil as in a specific example of pollution cleaning to be explained later, can adsorb arsenic, phosphoric acid, selenium and chromium contained in the polluted water or the polluted soil, thereby cleaning the polluted water or the polluted soil. At the adsorption of arsenic, phosphoric acid or the like, there is executed a substitution of $SO_4^{2-}$ or $HPO_4^{2-}$ contained in the new compound with arsenic, phosphoric acid or the like contained in the polluted water or the polluted soil.

As a specific example of the pollution cleaning, in case of cleaning water polluted with trivalent arsenic having a reducing property, a process of (i) pumping up the underground water, (ii) executing an oxidation for example by aeration to convert trivalent arsenic into pentavalent, (iii) adding the aforementioned phosphoric acid compound of shwertmannite thereby adsorbing arsenic, (iv) recovering the shwertmannite or the compound that has adsorbed arsenic for example by a precipitation or a filtration, and (v) discharging the water, allows to achieve a high-level cleaning of the underground water polluted with arsenic with a high safety. Otherwise it is also possible to achieve a cleaning by thrusting in a tubular member and pressing in a liquid containing the phosphoric acid compound of shwertmannite. Also in case of cleaning surfacial water in which arsenic is mostly in a pentavalent state, a process of (iii') adding the aforementioned phosphoric acid compound of shwertmannite to the surfacial water thereby adsorbing arsenic, (iv') recovering the shwertmannite or the compound that has adsorbed arsenic for example by a precipitation or a filtration, and (v') discharging the water, allows to achieve a high-level cleaning of the surfacial water polluted with arsenic with a high safety.

Also in case of cleaning polluted soil polluted with arsenic, the polluted soil is for example dug out, transported to and placed in a box-shaped plant, then agitated with water adjusted to acidic or water, and separated into a precipitate and a supernatant liquid thereby extracting the dissolved arsenic as the supernatant liquid, then the aforementioned phosphoric acid compound of shwertmannite is added to the supernatant liquid to adsorb arsenic, and the precipitated soil is taken out to complete the cleaning. Otherwise a cleaning is executed by adding the phosphoric acid compound of shwertmannite or a liquid containing the same to a place, formed as a pool by digging out the soil and called a reaction reservoir. Otherwise a cleaning is executed by adding the phosphoric acid compound of shwertmannite or a liquid containing the same while agitating the polluted soil with a heavy machinery. Otherwise a tubular member incorporating a liquid containing the phosphoric acid compound of shwertmannite is pierced into the soil, and the liquid containing the phosphoric acid compound of shwertmannite is ejected through the tubular member into the soil for example under a pressure of 200-400 mg/cm$^2$, and the cleaning is executed by ejecting the liquid while the tubular member is extracted under rotation if necessary. Such ejecting method is applicable also to polluted water.

INDUSTRIAL APPLICABILITY

The new compound of the present invention, being highly stable and having a high adsorbing ability to an adsorbable substance such as arsenic, can exhibit a cleaning function of a high level in stable manner in cleaning polluted water or polluted soil. Therefore, any one of the new compound, the method for stabilizing shwertmannite and the cleaning method for polluted water or polluted soil by the new compound has a high efficacy for the cleaning of polluted water or polluted soil.

The invention claimed is:

1. A compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$).

2. A compound represented by a composition formula $Fe_8O_8(OH)_{8-2x}((SO_4)_a, ((HPO_4)_b)_x \times nH_2O$ (a+b=x, $1 \leq x \leq 1.75$, $0 < a \leq 1.658$, $0.092 \leq b \leq x$).

3. A compound represented by a composition formula $Fe_8O_8(OH)_{8-2x}SO_4)_a, (HPO_4)_b)_x$ (a+b=x, $1 \leq x \leq 1.75$, $0 < a \leq 1.253$, $0.497 \leq b \leq x$).

4. A method for stabilizing shwertmannite which comprises adding a shwertmannite of a composition formula of $Fe_8O_8(OH)_{8-2x}(SO_4)_x$ ($1 \leq x \leq 1.75$) to a phosphoric acid solution of a pH value of 2-9 so as to achieve a stabilization by an adsorption of phosphoric acid as a compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$).

5. A method for cleaning polluted water or polluted soil which comprises adding a compound represented by a composition formula $Fe_8O_8(OH)_{8-2x}((SO_4)_a, (HPO_4)_b)_x$ (a+b=x, $1 \leq x \leq 1.75$, $0 < a \leq 1.658$, $0.092 \leq b \leq x$) to polluted water or polluted soil and causing an adsorbable substance contained in the polluted water or polluted soil to be adsorbed by the compound.

* * * * *